United States Patent [19]

Hensley

[11] Patent Number: 5,114,595

[45] Date of Patent: May 19, 1992

[54] MULTIPLE SCREEN FILTER AND METHOD

[75] Inventor: Jerry L. Hensley, Odessa, Tex.

[73] Assignee: Coyanosa Operations Company, Inc., Odessa, Tex.

[21] Appl. No.: 657,444

[22] Filed: Feb. 19, 1991

[51] Int. Cl.⁵ .............................................. B01D 24/46
[52] U.S. Cl. ................................. 210/792; 210/793; 210/795
[58] Field of Search ............... 210/671, 673, 675, 677, 210/678, 793, 795, 796, 798

[56] References Cited

U.S. PATENT DOCUMENTS

| | | | |
|---|---|---|---|
| 2,855,364 | 10/1958 | Roberts | 210/274 |
| 3,550,774 | 12/1970 | Hirs | 210/67 |
| 3,557,955 | 1/1971 | Hirs | 210/67 |
| 3,780,861 | 12/1973 | Hirs | 210/80 |
| 3,992,291 | 12/1976 | Hirs | 210/23 |
| 4,139,473 | 2/1979 | Alldredge | 210/290 |
| 4,496,464 | 1/1985 | Hensley | 210/792 |
| 4,707,252 | 11/1987 | Durot et al. | 210/188 |
| 4,787,987 | 11/1988 | Hensley | 210/792 |
| 4,826,609 | 5/1989 | Hensley | 210/792 |
| 4,861,472 | 8/1989 | Weis | 210/268 |

Primary Examiner—Stanley S. Silverman
Assistant Examiner—Cynthia L. Nessler
Attorney, Agent, or Firm—Crutsinger & Booth

[57] ABSTRACT

A method and apparatus for filtering a fluid through a particulate filter medium and for periodically scrubbing the particulate filter medium of accumulated contaminating material. During the filtration cycle, the particulate filter medium is retained with a filtration vessel by a bottom screen. During the scrubbing cycle, the particulate filter medium is retained within the filtration vessel by the bottom screen and a top screen. The combined surface area of the bottom screen and the top screen is substantially greater than the surface area of the bottom screen alone. During the scrubbing cycle, the particulate filter medium is fluidized with a scrubbing fluid and violently circulated to remove accumulated contaminating material from the filter medium, thereby suspending the contaminating material in the fluidized mixture. Meanwhile, the level of suspended contaminating material in the fluidized mixture is diluted by circulating a scrubbing fluid through the fluidized filter medium so that the contaminating material is removed through both the bottom screen and the top screen but the particulate filter medium is retained within the filtration vessel by the bottom screen and the top screen. The pressure differential across the bottom screen and the top screen during the scrubbing cycle is substantially reduced relative to the pressure differential across the bottom screen during a filtration cycle.

8 Claims, 6 Drawing Sheets

COLD START: Fluidizing the filter medium before starting the circulating system.

SCRUBBING CYCLE:

STEP ONE: Fluidizing and scrubbing the particulate filter medium with a scrubbing fluid while removing the scrubbing fluid through the bottom screen and a top screen.

STEP TWO: Displacing the fluidized filter medium from the circulating pump with a scrubbing fluid.

STEP THREE: Force settling the fluidized filter medium to reconstitute a random and uniform particulate filter medium.

STEP FOUR: Purging the filtration vessel of any remaining scrubbing fluid that contains high levels of suspended contaminates.

FILTRATION CYCLE:

Filtering a contaminated fluid through a particulate filter meduim where the filter medium is retained within the filtration vessel by a bottom screen.

*Fig. 6*

MULTIPLE SCREEN FILTER AND METHOD

TECHNICAL FIELD

The present invention pertains to filter systems for purifying a fluid. The filter systems of the invention have a multiple screen scrubbing apparatus for cleaning a particulate filter medium.

BACKGROUND OF THE INVENTION

Filtration systems having particulate filter media are used to purify water and other contaminated fluids of particulate contaminates and organic contaminates. The design of the basic filtration system is relatively simple, however, the problem of how to periodically regenerate a particulate filter medium has complicated the filtration apparatus.

The most common solution to the problem has been to backwash the filter medium, that is, reverse the direction of flow through the filter medium. Backwashing is subject to at least two major shortcomings. First, the particulate filter medium traps contaminates that require much more energy to remove from the filter medium than the energy required to trap the contaminates in the first place. Therefore, reversing the flow through the filter medium cannot dislodge such contaminates. After a short time, the filter medium begins to form into balls of tar and to have vertical channels. Secondly, the particulate filter medium is resettled by gravity. The particulate filter medium tends to resettle non-uniformly and in strata; the heavier particles tend to settle toward the bottom and the lighter particles tend to settle toward the top. When the particulate filter medium is stratified or has vertical channels, the effectiveness of the filter medium is greatly impaired.

Another solution to the problem of regenerating the particulate filter medium has been to remove the particulate filter medium from the filtration vessel and scrub it in a separate vessel. This solution is also subject to at least one major shortcoming. The process of removing the filter material from the filtration vessel, cleaning the filter medium, and returning the filter medium to the vessel is extremely complicated and presents difficult engineering problems.

But one of the most persistent problems with backwashing or scrubbing the particulate filter medium has been collapsing of the backwash screen. A screen is used to retain the particulate filter medium within the filtration vessel during filtration and backwash cycles. The backwash screen is typically formed into a cylindrical shape. During a backwash cycle, the high velocity of the particulate filter medium within the filtration vessel and the high pressure drop across the screen causes the filter medium to be driven into the screen with such velocity that the screen becomes plugged and collapses. Even if the screen does not collapse, the screen becomes partially plugged and begins to act as a filter preventing contaminates from exiting the filtration vessel during a backwashing or scrubbing cycle.

Therefore, it is an object of the present invention to provide a filter system having a particulate filter medium that can be thoroughly scrubbed of accumulated contaminates, including contaminating particulates and contaminating oils, greases, and waxes. It is a further object of the invention to provide a scrubbing apparatus and method that scrubs the particulate filter medium within the filtration vessel. It is an important object of the invention to provide a scrubbing apparatus that will not plug or collapse the screens used to retain the filter medium within the filtration vessel. It is another object of the invention to provide a simple, low maintenance filtration system and method. It is another object of the invention to provide an apparatus and method to force settle a particulate filer medium so that the filter medium is randomly and uniformly reconstituted. Further objects and features of the invention will be apparent to those skilled in the art upon reading the following detailed disclosure.

SUMMARY OF THE INVENTION

The filter apparatus and multiple screen scrubbing apparatus of the invention is an apparatus for removing contaminants from a fluid flowing through a filter system during a filtration cycle and for periodically scrubbing the filter medium during a scrubbing cycle. The multiple screen scrubbing apparatus of the invention provides an extremely low maintenance filtration system.

The filtration apparatus comprises: a filtration vessel; a particulate filter medium within the filtration vessel, the particulate filter medium capable of being fluidized; a bottom screen attached to the interior surfaces of the filtration vessel and positioned within the filtration vessel, the bottom screen being adapted to retain the particulate filter medium above the bottom screen while allowing a fluid pass through the bottom screen; a contaminated fluid inlet positioned above the particulate filter medium, the contaminated fluid inlet being adapted to introduce a contaminated fluid into the top of the filtration vessel above the filter medium; a contaminated fluid valve for controlling the flow rate of the contaminated fluid through the contaminated fluid inlet; a contaminated fluid pump for pumping the contaminated fluid through the contaminated fluid inlet and into the filtration vessel; a purified fluid outlet positioned below the bottom screen, the purified fluid outlet for removing a purified fluid from the filtration vessel; and a purified fluid valve for controlling the flow rate of the filtered fluid through the purified fluid outlet.

In the preferred embodiment of the invention, the purified fluid valve is an "off/on" type valve and further comprises purified fluid orifice plates for controlling the flow rate of the purified fluid through the purified fluid outlet. Preferably, the contaminated fluid inlet introduces contaminated fluid into the center of the filtration vessel.

The filter medium within the filtration vessel is formed of a particulate material such as crushed walnut shells, chipped iron wood, chipped red oak, crushed pecan shells, crushed clam shells, or the like. Crushed walnut shells provide one of the most effective filter medium; other particulate filter media have a greater tendency to clog, are more difficult to scrub of accumulated contaminates, or are simply more expensive. Black walnut shells are more durable than English walnut shells because black walnut shells are harder. Black walnut shells also can be crushed to a more uniform mesh size because they are so hard, therefore, they tend to form a more uniform filter medium.

The scrubbing apparatus comprises the filtration apparatus and additionally comprises: a top screen attached to the interior surfaces of the filtration vessel and positioned within the filtration vessel above the bottom screen and above the particulate filter medium, the top screen adapted to retain the filter medium beneath the top screen while allowing a fluid to pass through the top screen; a clean scrubbing fluid inlet positioned just above the bottom screen and adjacent to the particulate filter medium and below the top screen, the clean scrubbing fluid inlet oriented tangentially to the cylindrical surface of the filtration vessel so that the clean scrubbing fluid is introduced into the filtration vessel so as to create a toroidal flow path within the filtration vessel; a clean scrubbing fluid valve for controlling scrubbing fluid flow through the clean scrubbing fluid inlet; a top scrubbing fluid outlet positioned above the top screen, the top scrubbing fluid outlet for removing scrubbing fluid from the filtration vessel above the top screen; a top scrubbing fluid valve for controlling the fluid flow rate through the top scrubbing fluid outlet; a bottom scrubbing fluid outlet positioned below the bottom screen, the bottom scrubbing fluid outlet for removing scrubbing fluid from the filtration vessel below the bottom screen; a bottom scrubbing fluid valve for controlling the fluid flow rate through the bottom scrubbing fluid outlet; and a circulating apparatus for fluidizing and scrubbing the filter medium.

In the preferred embodiment of the invention, the top scrubbing fluid valve is an "off/on" type valve and the apparatus further comprises top scrubbing fluid orifice plates for controlling the flow rate of the scrubbing fluid through the top scrubbing fluid outlet. Similarly, the bottom scrubbing fluid valve is an "off/on" type valve and the apparatus further comprises bottom scrubbing fluid orifice plates for controlling the flow rate of the scrubbing fluid through the bottom scrubbing fluid outlet.

The circulating apparatus for fluidizing and scrubbing the filter medium comprises: a circulating fluid outlet positioned above the bottom screen and in fluid communication with the contaminated fluid inlet; a circulating pump for drawing scrubbing fluid and fluidized filter medium through the circulating fluid outlet; a circulating fluid inlet positioned just above the bottom screen and adjacent to the particulate filter medium, the circulating fluid inlet oriented tangentially to the cylindrical surface of the filtration vessel so that the circulating fluid is introduced into the filtration vessel so as to create a toroidal flow path within the filtration vessel; and a circulating fluid valve for controlling the fluid flow through the circulating fluid inlet.

The toroidal flow path created by the tangential orientations of the clean scrubbing fluid inlet and the circulating fluid inlet is most violent toward the bottom of the filtration vessel just above the bottom screen and toward the vertical walls of the filtration vessel. The toroidal flow path forms a vortex that tends to be less violent toward the center of the filtration vessel, particularly near the top of the filtration vessel just below the top screen. Therefore, in the preferred embodiment of the invention, the circulating fluid outlet withdraws scrubbing fluid and fluidized filter medium from the center of the filtration vessel and near the top of the filtration vessel just below the top screen. The violence of the flow is thereby increased beneath the center of the top screen. Thereby the total interior of the filtration vessel participates in the fluidization of the filter medium and the entire surface area of both the bottom screen and the top screen are scrubbed so that they do not become plugged with contaminates.

The filtration cycle is typical of down flow filtration systems. The contaminated fluid flows through the contaminated fluid inlet, into the top of the filtration vessel, down through the filter medium, down through the bottom screen, and the fluid, now purified, is removed through the purified fluid outlet from the bottom of the filtration vessel.

The scrubbing cycle is generally accomplished by the following method: (1) fluidizing the filter medium with a scrubbing fluid and violently circulating the fluidized filter medium to remove accumulated contaminating material from the filter medium and clean the filter medium, thereby suspending the contaminating materials in the fluidized mixture, and meanwhile diluting the level of contaminating material in the fluidized mixture by circulating scrubbing fluid through the filtration vessel so that the contaminating materials are removed through both the bottom screen and top screen but the fluidized filer medium is retained within the vessel by the bottom screen and top screen; (2) displacing fluidized filter medium from the circulating pump with scrubbing fluid and/or contaminated fluid; (3) rapidly force settling the fluidized filter medium to form a randomly and uniformly settled filter medium ; and (4) purging the filtration vessel of any remaining scrubbing fluid that contains high levels of suspended contaminates before beginning another filtration cycle. It is possible to execute step two (2) and step three (3) of the scrubbing cycle simultaneously.

Withdrawing the scrubbing fluid with the suspended contaminates through both the bottom screen and the top screen reduces the velocity of the fluidized filter medium in the direction of the either screen and reduces the differential pressure across the screens. The purpose of the multiple screens is to substantially increase the cross-sectional surface area of the screen during a scrubbing cycle relative to the cross-sectional surface area of the screen during a filtration cycle, thereby concomitantly substantially reducing the differential pressure across the screen during a scrubbing cycle relative to the differential pressure across the screen during a filtration cycle. Reducing the differential pressure across the screen during the scrubbing cycle substantially reduces the likelihood that the screen will become plugged or collapse. The violent circulation of the fluidized filter medium between the bottom screen and the top screen serves to clean the screens and prevent plugging of the screens. The design of the apparatus of the invention is very simple and easy to maintain. For example, the apparatus can be designed with as few as six (6) valves.

BRIEF DESCRIPTION OF THE DRAWINGS

The features and advantages of the invention will become more readily apparent from the following drawings, wherein like reference numerals refer to like parts throughout the drawings:

FIG. 6 is a flow chart of the operation of a down flow filter system incorporating the multiple screen scrubbing method of the invention.

DETAILED DESCRIPTION OF THE INVENTION

Figure 1:
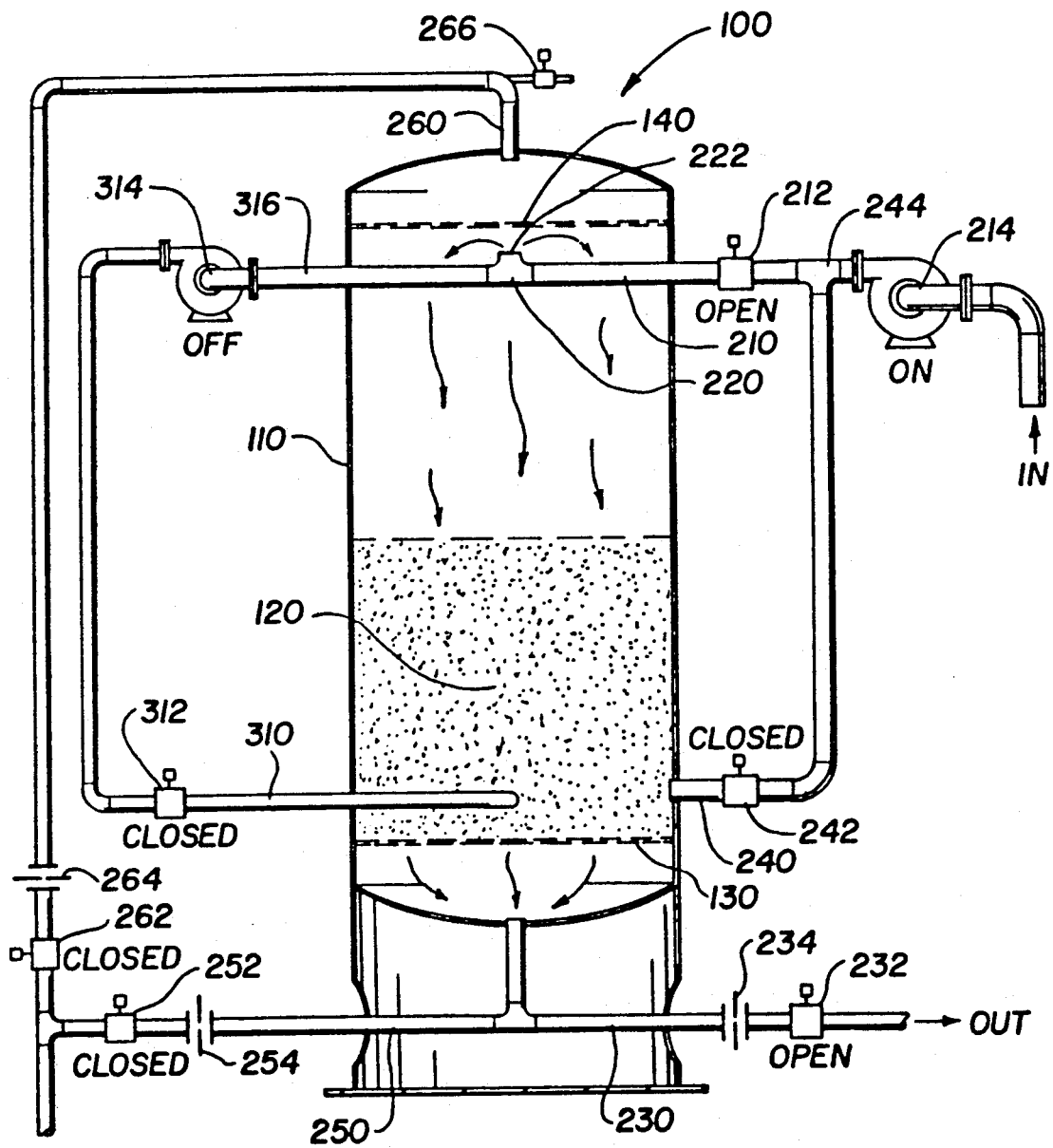
FIG. 1 is a diagram of a down flow filter system incorporating the multiple screen scrubbing apparatus of the invention, the apparatus is represented in a filtering cycle.

The various parts of the filter system incorporating the multiple screen scrubbing apparatus will be described first, then the cooperation of the parts of the apparatus and the operational steps will be described in detail.

THE APPARATUS

Referring now to FIGS. 1-5 of the drawing, the numeral 100 generally designates a down flow type filter system that incorporates the multiple screen scrubbing apparatus of the invention. As shown in FIG. 6, the filter system 100 has a cold start procedure and two basic operating cycles: scrubbing and filtering. The filter system 100 is typically used to purify water, but it could be adapted to purify other fluids such as organic solvents.

The filtration vessel 110 is water tight. The typical filtration vessel 110 is generally cylindrical in shape. The typical filtration vessel 110 has a diameter between four (4) feet and twelve (12) feet and a height between eight (8) and sixteen (16) feet.

The filter medium 120 within the filtration vessel 110 is formed of a particulate material such as crushed walnut shells, chipped iron wood, chipped red oak, crushed pecan shells, crushed clam shells, or the like. Crushed walnut shells provide one of the most effective filter medium; other particulate filter media have a greater tendency to clog, are more difficult to scrub of accumulated contaminates, or are simply more expensive. Black walnut shells are more durable than English walnut shells because black walnut shells are harder. Black walnut shells also can be crushed to a more uniform mesh size because they are so hard, therefore, they tend to form a more uniform filter medium. The typical filter medium is crushed to a 12-20 mesh particle size. The particulate filter medium 120 is capable of removing particulate contaminates from a fluid as well as oil, grease, tallow, wax, blood, and other organic contaminates. A particulate medium is a depth-type filter medium, therefore, the greater the depth of filter medium, the more effective the purification of the fluid passing through the filter medium.

The filter medium 120 primarily removes particulate contaminates from a fluid by the mechanism of surface impaction. The surface tension of the filter medium and the surface tension of the particulate contaminates cause the particulate contaminates to adhere to the surfaces of the filter medium. Thus the contaminated fluid is filtered or purified of particulate contaminates.

The theoretical lower limit of the size of particulate contaminates the filter medium can remove from a fluid is on the order of one-third ($\frac{1}{3}$) of the square root of the mean pore throat size of the filter medium. The mean pore throat size of a filter medium is the mean diameter of the passages between the particles of the filter medium. For example, if the mean pore throat size of a filter medium is two-hundred-twenty-five (225) mil (thousandths of an inch), the filter medium can remove particulate contaminates down to about five (5) mil (thousandths of an inch) in size. The smaller the particles of the filter medium, the smaller the mean pore throat size of the filter medium and the smaller the size of particulate contaminates the filter medium can trap. The particulate contaminates adhere to the surfaces of the particulate filter medium and create a bridging effect between the surfaces of the filter medium, thereby reducing the pore throat size of the filter medium.

To a smaller degree, the filter medium 120 also removes particulate contaminates from the contaminated fluid by the mechanism of direct interception. When pore throat size of the filter medium is smaller than the size of the particulate contaminates, the particulate contaminates cannot pass through the filter medium and are trapped in the filter medium. Thus the contaminated fluid is filtered or purified of particulate contaminates. Incidentally, when a screen becomes partially plugged, the screen begins to act as a filter according to the mechanism of direct interception.

The filter medium 120 removes contaminating oils and other organic contaminates from the contaminated fluid by a chromatographic mechanism. The filter medium is hydrophilic; it does not actually trap the oil contaminates, but it slows the flow of the contaminating oils that are in the fluid relative to the flow of the pure fluid through the filter medium. The chromatographic effect of the column of filter medium is proportional to the molecular weight of the oil contaminants. Of course, numerous other factors, such as viscosity, specific gravity solubility, temperature, and pH, determine the chromatographic effect of the filter medium on different materials.

The required depth of filter medium 120 is determined by two factors: first, the length of time desired between scrubbing the filter medium of particulate contaminates and second, the molecular weight of the oil contaminates in the fluid.

According to the first factor, the greater the capacity of the filter medium to hold particulate contaminates, sometimes referred to as dirt capacity, the less frequent the scrubbing cycles to clean the filter medium. Once the filter medium reaches dirt capacity, the filter medium will blind off to certain sizes of particulate contaminates and fail to purify the contaminated fluid. The passages between the particles of filter medium also become progressively smaller and plugged, resulting in an increase in the pressure differential across the filter medium. Dirt capacity is directly proportional to the volume of the filter medium. Therefore, the greater the volume of filter medium, the less frequent the scrubbing cycles to clean the filter medium. Of course, the volume of filter medium is simply the cross-sectional horizontal area of the filter medium multiplied by the depth of the filter medium. Therefore, the dirt capacity of a filter medium can be related to the depth of the filter medium.

According to the second factor, the filter medium must undergo a scrubbing cycle to remove the oil contaminates before the oils permeate through the filter medium. If the oils permeate all the way through the filter medium, sometimes referred to as breaking through the filter medium, then the filter medium will fail to purify the oil contaminated fluid. For a typical filter medium, the greater the molecular weight of the contaminating oils in the fluid, the greater the chromatographic effect of the filter medium on the oils.

Therefore, to remove heavy oils, a lesser depth of the filter medium is required for a given frequency of scrubbing cycles. On the other hand, to remove light oils, a greater depth of the filter medium is required for a given frequency of scrubbing cycles. Based on the chromatographic effect of the filter medium on oils, if the depth of the filter medium is increased, the frequency of required scrubbing cycles can be reduced.

For most water purification applications, taking into account both the dirt capacity of the filter medium and the chromatographic effect of the filter medium on oils, the minimum filter medium depth should be about four (4) feet. For example, a filter medium consisting essential of crushed walnut shells and having a depth of four (4) feet is capable of purifying contaminated water having twenty-five (25) milligrams per liter of particulate contaminates between the range of zero (0) microns and one-hundred (100) microns to water having less than one (1) milligram per liter of particulate contaminates where the nominal particle size of the remaining particulate contaminates is less than five (5) microns in size. In other words, the filter could remove from the water ninety-eight (98) percent of all the particulate contaminates five (5) microns or greater. A filter medium depth of five (5) feet to six (6) feet is preferred. A filter medium depth of more than six (6) may be effective to remove light oils and to reduce the frequency of required scrubbing cycles.

There are other important advantages to having longer filtration cycles between scrubbing cycles: less waste scrubbing fluid is generated over a given period of operation and less down time for scrubbing cycles. For example, if the depth of the filter medium is only four (4) feet, then under typical operating conditions, the filter medium should be scrubbed at least every eighteen (18) hours. Over four (4) days, the filter medium must be scrubbed at least five (5) times. But if the depth of the filter medium is five (5) feet, then the filter medium should be scrubbed every twenty-four (24) hours. Over the same four (4) days, the filter medium would be scrubbed only four (4) times. Given that about the same amount of scrubbing fluid would be required for each scrubbing cycle whether the depth of the filter medium is four (4) feet or five (5) feet, the later results in about twenty (20) percent less waste scrubbing fluid and about twenty (20) percent less down time for scrubbing cycles.

As shown in FIGS. 1-5, a bottom screen 130 is attached to the interior surfaces of the vessel 110 and positioned within the filtration vessel 110. The bottom screen 130 is adapted to support and retain the filter medium above the bottom screen 130 while allowing a fluid to pass through the bottom screen 130. The slot openings of the bottom screen 130 is adapted so that during scrubbing of the filter medium 120, particulate contaminates may pass through the bottom screen 130 without plugging the bottom screen. For example, the bottom screen could have slot openings of fifteen (15) mil (thousandths of an inch) to twenty-two (22) mil (thousandths of an inch) and total openings of about twenty (20) percent to about twenty-five (25) percent of the surface area.

As illustrated in the preferred embodiment of the invention shown in FIGS. 1-5, the horizontal cross-sectional area of the bottom screen 130 equals the horizontal cross-sectional area of the volume of filter medium 120. If the downward flow of contaminated fluid through the filter medium were obstructed, dead spaces would be created within the filter medium that would reduce the effectiveness of the filter medium.

In the preferred embodiment of the invention illustrated in FIGS. 1-5, a top screen 140 is attached to the interior surfaces of the filtration vessel 110 and positioned within the filtration vessel 110 above the bottom screen 130 and above the filter medium 120. The top screen 140 is adapted to retain the filter medium 120 beneath the top screen 140 while allowing a fluid to pass through the top screen 140. The top screen 140 retains the fluidized filter medium within the filtration vessel 110 during a scrubbing cycle. The top screen 140 does not have to have the form illustrated in the preferred embodiment of the invention. For example, the top screen could be dome shaped or it could be located in a vertical plane inside of the filtration vessel. More than one top screen could be employed. The slot openings of the top screen 140 is adapted so that during scrubbing of the filter medium 120, particulate contaminates may pass through the top screen 140 without plugging the top screen. For example, the bottom screen could have slot openings of fifteen (15) mil (thousandths of an inch) to twenty-two (22) mil (thousandths of an inch) and total openings of about twenty (20) percent to about twenty-five (25) percent of the surface area.

The volume of filter medium 120 occupies between about one-third ($\frac{1}{3}$) to two-thirds ($\frac{2}{3}$) of the volume between the bottom screen 130 and the top screen 140 within the filtration vessel 110. Preferably, the volume of filter medium 120 occupies about one-half ($\frac{1}{2}$) of the volume between the bottom screen 130 and the top screen 140 within the filtration vessel 110. One advantage of the invention is that the exact depth of the filter medium 120 is not critical to the operation of the apparatus. The volume between the bottom screen 130 and the top screen 140 is large relative to the volume of settled filter medium 120 so that the filter medium may be agitated and fluidized during a scrubbing cycle of operation.

A contaminated fluid inlet 210 is positioned between the filter medium 120 and the top screen 140. Preferably, the contaminated fluid inlet 210 is positioned just below the top screen 140. During a filtering cycle, the contaminated fluid inlet 210 introduces a contaminated fluid into the filtration vessel 110 above the filter medium 120. For reasons hereinafter explained in detail, the contaminated fluid inlet 210 is preferably connected to the "T" 220 within the vessel 110 as shown in FIGS. 1-5. As illustrated in the drawing, the orifice 222 of the "T" 222 is preferably upwardly directed for reasons hereinafter explained in detail. The contaminated fluid enters the filtration vessel 110 through the orifice 222 of the "T" 220. A contaminated fluid valve 212 controls the flow rate of the contaminated fluid through the contaminated fluid inlet 210. The contaminated fluid valve 212 may be a simple "off/on" type valve. A contaminated fluid pump 214 pumps the contaminated fluid through the contaminated fluid valve 212, the contaminated fluid inlet 210, through the orifice 222 of the "T" 220, and into the center of the filtration vessel 110. If the contaminated fluid inlet 210 is located close to the top screen 140, the contaminated fluid has more time to spread out evenly within the top portion of the filtration vessel 110 before the contaminated fluid flows down through the filter medium 120.

For reasons hereinafter explained in more detail, the orifice 222 of the "T" 220 should be positioned just below the top screen 140. During a scrubbing cycle, the toroidal flow of fluidized filter medium will be very rapid toward the edges of the top screen 140, but the flow just below the top screen 140 and at the center of the top screen 140 will be very little. Preferably the orifice 222 should be spaced from the top screen 140 so that during a scrubbing cycle, fluidized filter medium will be drawn from the edges of top screen 140 across the top screen toward the center of the top screen thereby scrubbing the top screen 140. It has been discovered that in order to maximize the flow of fluidized filter medium from the edges of the top screen 140 toward the center of the top screen 140, the orifice 222 of "T" 220 should be spaced apart from the top screen 140 according to the formula:

$$\text{distance} = \frac{(1.5)(\text{surface area of orifice})}{(\text{circumference of orifice})}$$

An alternative way of expressing the formula, where D is the diameter of the orifice 222:

$$\text{distance} = \frac{(1.5)[\pi(D/2)^2]}{\pi D}$$

A simpler way of expressing the formula, where D is the diameter of the orifice 222:

$$\text{distance} = (1.5)[(D/2)^2]/D$$

For example, if the orifice 222 is six (6) inches in diameter, the surface area of the orifice 222 is about twenty-eight (28) square inches, and the circumference of the orifice 222 is about eighteen (18) inches. Therefore, the distance the orifice 222 of the "T" 220 should be spaced from the top screen 140 is one-and-a-half times the surface area of the orifice 222 divided by the circumference of the orifice 222, or about two (2) inches beneath the top screen 140. The purpose of the calculation is to maximize the flow across the center of the top screen 140. If the distance of the orifice 222 from the top screen 140 is substantially less than the distance determined according to the above formula, then fluid is drawn into the orifice 222 of the "T" 220 from above the top screen 140. If the distance of the orifice 222 from the top screen 140 is substantially greater than the distance determined according to the above formula, then the fluidized filter medium tends to circulates between the orifice 222 and the top screen 140 such that the flow is less horizontal across the top screen 140, thereby decreasing the effectiveness of the scrubbing action of the fluidized filter medium on the center of the top screen 140.

A purified fluid outlet 230 is positioned below the bottom screen 130. During a filtering cycle, the purified fluid outlet 230 allows the contaminated fluid, purified after passing through the filter medium 120 and the bottom screen 130, to flow from the filtration vessel 110. A purified fluid valve 232 controls the flow rate of the purified fluid through the purified fluid outlet 230. In the preferred embodiment of the invention, the purified fluid valve is an "off/on" type valve and purified fluid orifice plates 234 control the flow rate of the purified fluid through the purified fluid outlet.

A clean scrubbing fluid inlet 240 is positioned above the bottom screen 130 and next to the filter medium 120. Preferably the clean scrubbing fluid inlet 240 is positioned just above the bottom screen 130, preferably no more than six (6) inches from the bottom screen 130. The clean scrubbing fluid inlet 240 is oriented tangentially to the vertical cylindrical walls of the filtration vessel 110. During the first step of a scrubbing cycle, the clean scrubbing fluid inlet 240 introduces a scrubbing fluid into the filtration vessel 110 so that the clean scrubbing fluid creates a toroidal flow path within the filtration vessel 110. The clean scrubbing fluid inlet 240 should direct the flow of clean scrubbing fluid into the bottom portion of the filter medium 120 to agitate and fluidize all of the filter medium. The toroidal flow path within the filtration vessel 110 creates lift for the filter medium so that the filter medium whirls around within the filtration vessel 110 between the bottom screen 130 and the top screen 140. The toroidal flow path causes the fluidized filter medium to sweep across the surfaces of the bottom screen 140 and the top screen 130 thereby scrubbing the screens and preventing the screens from becoming plugged.

A clean scrubbing fluid valve 242 controls the rate of fluid flow through the clean scrubbing fluid inlet 240. The clean scrubbing fluid valve 242 may be a simple "off/on" type valve.

As shown in FIGS. 1-5 of the drawing, a "T" 244 is inserted between the contaminated fluid valve 212 and the high pressure side of the contaminated fluid pump 214 to connect the clean scrubbing fluid inlet 240 to the contaminated fluid inlet 210. In the preferred embodiment of the invention shown in FIGS. 1-5, contaminated fluid is used also as the scrubbing fluid. One of the important advantages of using the contaminated fluid also as the scrubbing fluid is that the discharge from the contaminated fluid pump 214 is not closed during the scrubbing cycle. If the discharge from a pump is closed, the pump may exceed the pump manufacturer's specifications and could cause high wear or damage to the pump. As an alternative to using the contaminated pump 214 to introduce a scrubbing fluid into the filtration vessel 110, a separate scrubbing fluid pump (not shown) may be included in the apparatus for pumping a separate scrubbing fluid through the clean scrubbing fluid inlet 240 and into the filtration vessel 110. In such an embodiment, the contaminated fluid pump 214 would be turned off during the scrubbing cycle.

A bottom scrubbing fluid outlet 250 is positioned below the bottom screen 130. During the scrubbing cycle, the bottom scrubbing fluid outlet 250 allows the clean scrubbing fluid, laden with contaminates from scrubbing the filter medium 120, to flow from the bottom of the filtration vessel 110. A bottom scrubbing fluid valve 252 controls the flow rate of the scrubbing fluid through the bottom scrubbing fluid outlet 250. In the preferred embodiment of the invention illustrated in FIGS. 1-5, the bottom scrubbing fluid valve 252 is an "off/on" type valve and the bottom scrubbing fluid orifice plates 254 control the flow rate of the scrubbing fluid through the bottom scrubbing fluid outlet 250.

A top scrubbing fluid outlet 260 is positioned above the top screen 140. During the scrubbing cycle, the top scrubbing fluid outlet 260 allows the scrubbing fluid, laden with contaminates from scrubbing the filter medium 120, to flow from the top of the filtration vessel 110. A top scrubbing fluid valve 262 controls the flow rate of the scrubbing fluid through the top scrubbing fluid outlet 260. In the preferred embodiment of the invention illustrated in FIGS. 1-5, the top scrubbing fluid valve 262 is an "off/on" type valve and the top scrubbing fluid orifice plates 264 control the flow rate of the scrubbing fluid through the top scrubbing fluid outlet 260.

An optional top scrubbing fluid vent 266 permits venting gaseous contaminates that may degas from the contaminated fluid and accumulate in the top of the filtration vessel 110.

During the scrubbing cycle, larger mass particles and high molecular weight oils tend to migrate through the bottom screen 130 and toward the bottom of the filtration vessel 110. Smaller mass particles and low molecular weight oils, on the other hand, tend to migrate through the top screen 140 and toward the top of the filtration vessel 100. But the violence of the agitation and fluidization of the filter medium 120 during the scrubbing cycle tends to offset gravity acting on the contaminates. Of course, gravity acting on larger mass particles and higher molecular weight oils results in a greater tendency for these contaminates to move downward that is more difficult to offset by agitation. In the preferred embodiment of the invention shown in FIGS. 1-5, the use of both the bottom scrubbing fluid outlet 250 and the top scrubbing fluid outlet 260 ensures the removal of a maximum amount of both heavy and light contaminates accumulated in the filter medium 120.

Purified fluid orifice plates 234, bottom scrubbing fluid orifice plates 254, and top scrubbing fluid orifice plates 264 may be included in the apparatus to control the flow rate through the purified fluid outlet, the top scrubbing fluid outlet, and the bottom scrubbing fluid outlet, respectively. The top scrubbing fluid orifice plates 254 and the bottom scrubbing fluid orifice plates 264 also set the ratio of scrubbing fluid flowing from the bottom scrubbing fluid outlet 250 and the top scrubbing fluid outlet 260. The orifice plates 234, 254, and 264 are well known to those skilled in the art. Each of the orifice plates 234, 254, and 264 typically comprise a pair of adjustable plates. Each of the pair of adjustable plates has a hole. The holes in the adjustable plates are the same size, but the adjustable plates may be aligned such that the area of the holes overlap anywhere between zero (0) percent and one-hundred (100) percent. The degree of overlap between the holes of a pair of adjustable plates controls the degree of flow through the orifice plates. Of course, the degree of overlap between the holes in a pair of adjustable plates is adjustable, but the overlap is normally preset for a particular type of purification application. For example, if larger mass particles and higher molecular weight oils account for the bulk of the contaminates in the contaminated fluid, the openings of the orifice plates 254 and 264 could be adjusted so that when the bottom scrubbing fluid valve 252 and the top scrubbing fluid valve 262 are open to the same degree, eighty (80) percent of the scrubbing fluid flows from the bottom scrubbing fluid outlet 250 and twenty (20) percent of the scrubbing fluid flows from the top scrubbing fluid outlet 260.

A circulating fluid outlet 316 is positioned between the filter medium 120 and just below the top screen 140. For reasons hereinafter explained in detail, the circulating fluid outlet 316 is preferably connected to the "T" 220 as shown in FIGS. 1-5. The circulating fluid outlet 316 is in fluid communication with a circulating pump 314. The circulating pump 314 is in fluid communication with a circulating fluid inlet 310 positioned above the bottom screen 130 and next to the filter medium 120. Preferably the circulating fluid inlet 310 is positioned just above the bottom screen 130, no more than six (6) inches from the bottom screen 130. The circulating fluid inlet 310 is oriented tangentially to the cylindrical surface of the filtration vessel 110. During a scrubbing cycle, the circulating fluid inlet 310 introduces the circulating fluid into the filtration vessel 110 so that the circulating fluid creates a toroidal flow path within the filtration vessel 110. The circulating fluid inlet 310 should direct the flow of circulating fluid into the bottom portion of the filter medium 120 to help agitate and fluidize all of the filter medium. In the preferred embodiment shown in FIGS. 1-5, the circulating fluid inlet 310 extends into the filter medium 120. A circulating fluid valve 312 controls the fluid flow rate through the circulating inlet 310. The circulating fluid valve 312 may be a simple "off/on" type valve.

The toroidal flow path created by the tangential orientations of the clean scrubbing fluid inlet 240 and the circulating fluid 310 inlet is most violent toward the bottom of the filtration vessel 110 just above the bottom screen 130 and toward the vertical walls of the filtration vessel 110. The toroidal flow path forms a vortex that tends to be less violent toward the center of the filtration vessel 110, particularly near the top of the filtration vessel just below the top screen 140. Therefore, in the preferred embodiment of the invention, the circulating fluid outlet 316 withdraws scrubbing fluid and fluidized filter medium from the center of the filtration vessel 110 and near the top of the filtration vessel just below the top screen 140. Specifically, the circulating fluid outlet 316 withdraws fluid from the vessel through orifice 222 of "T" 220. The space between the orifice 222 of the "T" 220 is preferably set as hereinbefore described. The violence of the fluid flow is thereby increased beneath the center of the top screen 140. The total interior of the filtration vessel 110 participates in the fluidization of the filter medium and the entire surface area of both the bottom screen 130 and the top screen 140 are scrubbed so that they do not become plugged with contaminates.

The invention contemplates that a plurality of screens, inlets, outlets, valves, or pumps may advantageously replace the singular elements represented in the present description and in the drawing. For example, for one of the larger filtration systems incorporating the multiple screen scrubbing apparatus of the invention, the circulating system (which comprises the circulating fluid outlet 316, the circulating pump 314, the circulating fluid valve 312, and the circulating fluid inlet 310) could be replaced with two or more smaller circulating systems. A plurality of circulating systems could provide greater and more thorough circulation between the bottom screen 130 and top screen 140 within the filtration vessel 110.

The Method

Now that the parts of the filter system and multiple screen scrubbing apparatus have been described, the cooperation of the parts and the operational steps can be described in detail. Referring now to FIG. 6, the operation of the apparatus consists of two basic cycles, a scrubbing cycle and a filtration cycle. The scrubbing cycle is comprised of four elemental steps. The first time the apparatus is operated or if the power is interrupted, a cold start procedure should precede a first scrubbing cycle and filtration cycle. The operation of the apparatus is preferably controlled by a computer system (not shown). For convenience, the filtration cycle will be described first, then the four steps of the scrubbing cycle, and the cold start procedure will be described last.

Referring now to FIGS. 1 and 6, during a filtering cycle, the contaminated fluid valve 212 is open and the purified fluid valve 232 is open. The clean scrubbing fluid valve 242 is closed, the circulating fluid valve 312 is closed, the bottom scrubbing fluid valve 252 is closed, and the top scrubbing valve 262 is closed. The circulating pump 314 does not operate, that is, it is turned off. The contaminated fluid pump 214 operates to pump contaminated fluid through the contaminated fluid inlet 210, through the upwardly extending orifice 222 of "T" 220, into the filtration vessel 110, down through the filter medium 120 within the filtration vessel 110, through the bottom screen 130, and though the purified fluid outlet 230 from the filtration vessel 110. The top scrubbing fluid vent 266 may be opened periodically or as a continuous bleed to release any gases that degas from the contaminated fluid and accumulate in the top of the filtration vessel 110. The upward orientation of the orifice 222 of the "T" 220 creates turbulence in the top portion of the filtration vessel 110. The turbulence distributes the contaminated fluid evenly throughout the upper portion of the filtration vessel so that it may uniformly descend to the filter medium and through the filter medium.

The filter medium 120 removes contaminating material from the contaminated fluid and produces a purified fluid. As previously discussed, the duration of the filtration cycle depends at least in part on the depth of the filter medium 120. The volume and depth of the filter medium should be sufficient for a filtration cycle duration between a few hours and a few days, preferably at least twenty-four (24) hours at a flow rate of up to about sixteen (16) gallons per minute per square foot of horizontal cross-sectional surface area of filter medium 120. When pumping the contaminated fluid into the filtration vessel 110 at a pressure of about fifty (50) pounds per square inch, the pressure differential across a filter medium 120 comprised of crushed walnut shells and having a depth of about five (5) feet is about five (5) pounds per square inch. The small differential pressure across the filter medium 120 compresses the filter medium about one (1) to two (2) inches. The compressed filter medium exhibits improved particle filtration and improved chromatographic effect on oils. As the filter medium accumulates contaminating material, the differential pressure across the filter medium will increase. Therefore, the filtration cycle may also be terminated when the differential pressure across the filter medium exceeds a certain preset level, eighteen (18) pounds per square inch, for example.

Referring now to FIG. 6, the scrubbing cycle is generally accomplished by the following four steps: (1) fluidizing the filter medium and violently circulating the fluidized filter medium to remove accumulated contaminating material from the filter medium and clean the filter medium, thereby suspending the contaminating materials in the fluidized mixture, meanwhile diluting the level of contaminating material in the fluidized mixture by circulating scrubbing fluid through the filtration vessel and out through the bottom screen 130 and the top screen 140; (2) displacing fluidized filter medium from the circulating pump with scrubbing fluid and/or contaminated fluid; (3) rapidly force settling the fluidized filter medium to form a randomly and uniformly settled filter medium before beginning another filtration cycle; and (4) purging the filtration vessel of any remaining scrubbing fluid that contains high levels of suspended contaminates. It is possible to execute the second and third steps of the scrubbing cycle simultaneously.

Figure 2:
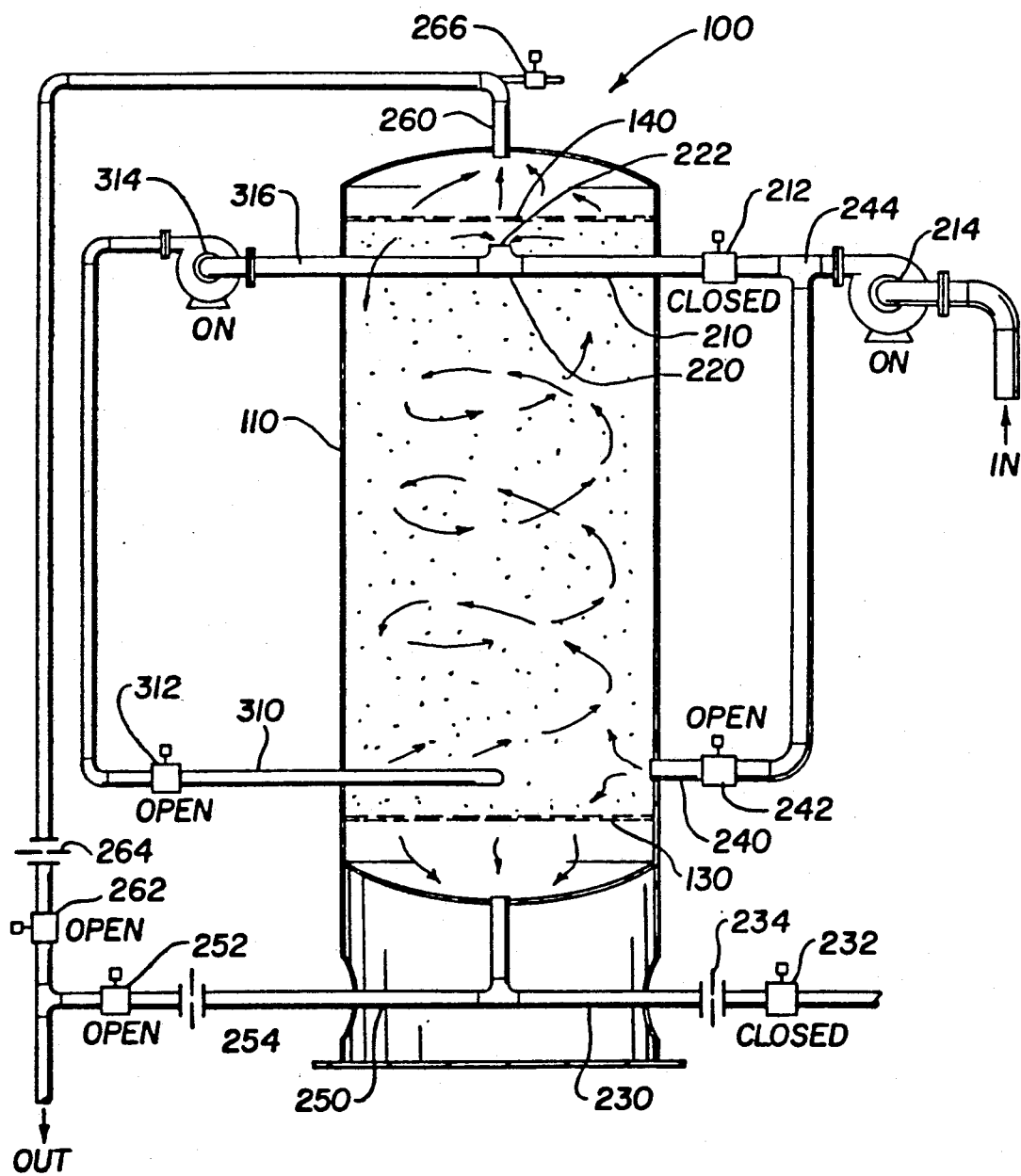
FIG. 2 is a diagram of a down flow filter system incorporating the multiple screen scrubbing apparatus of the invention, the apparatus is represented in the first step of a scrubbing cycle.

Referring now to FIG. 2 and 6, during the first step of the scrubbing cycle, the contaminated fluid valve 212 is closed and the purified fluid valve 232 is closed. The clean scrubbing fluid valve 242 is open and the circulating fluid valve 312 is open. The bottom scrubbing fluid valve 252 is open and the top scrubbing valve 262 is open. The top scrubbing fluid vent 266 also is closed.

The contaminated fluid pump 214 operates to pump contaminated fluid through the "T" 244, through clean scrubbing fluid inlet 240, into the filtration vessel 110, through the bottom screen 130 and the top screen 140, and through the bottom scrubbing fluid outlet 250 and the top scrubbing fluid outlet 260. The contaminated fluid pump 214 preferably operates at the same speed during both the filtration cycle and the scrubbing cycle. Therefore, the flow through the filtration vessel during the first step of the scrubbing cycle is the same as the flow through the filtration vessel during the filtration cycle.

But the flow through the bottom screen is reduced by about one-half ($\frac{1}{2}$) because about one-half the flow during the first step of the scrubbing cycle is removed through the top screen 140 and the top scrubbing fluid outlet 260. Therefore, the differential pressure across the screens is reduced by about one-half ($\frac{1}{2}$). For example, if the filtration flow rate through the filter is sixteen (16) gallons-per-minute-per-square-foot of horizontal cross-sectional area of filter medium 120, then the flow rate through each of the screens during the first step of the scrubbing cycle is only eight (8) gallons-per-minute-per-square-foot of horizontal cross-sectional area of filter medium 120 during. If ratio of flows between the bottom scrubbing fluid outlet 250 and top scrubbing fluid outlet 260 is unequal, the differential pressure across the bottom screen 130 and the top screen 140 may be reduced by less than one-half ($\frac{1}{2}$).

The circulating pump 314 draws fluidized filter medium from within the top portion of the filtration vessel 110 beneath the top screen 140, through the upwardly extending orifice 222 of the "T" 220, through the circulating fluid outlet 316, and into the circulating pump 314. The circulating fluid outlet 316 should preferably be spaced at least six (6) inches from the top of the filtration vessel 110 (distinguished from the top screen 140) so that any accumulated gas in the top of the filtration vessel 110 will not be drawn into the circulating pump 314 and cause the circulating pump 314 to gas lock. Gas locking the pump could otherwise be a problem, especially at start up of the circulating pump 314 or after maintenance of the circulating pump 314. The circulating pump 314 pumps the fluidized filter medium through the circulating fluid inlet 310 and injects the fluidized filter medium into the bottom portion of the filtration vessel above the bottom screen. In the preferred embodiment of the invention that includes a top screen 140 and a top scrubbing fluid outlet 260, it is advantageous to wait several seconds before starting the circulating pump 314 so that light oils and gases that may have accumulated in the top of the filtration vessel 110 can be withdrawn from the filtration vessel 110 through the top scrubbing fluid outlet to a storage facility (not shown). The circulating pump 314 is thereby additionally protected from gas lock and the filter medium does not have to be exposed to the contaminates that accumulate in the top of the filtration vessel 110.

On the other hand, the circulating fluid outlet 316 should be preferably located close to the top screen 140. Subject to leaving space above the circulating fluid outlet 316 for gases to accumulate as hereinbefore described, the volume within the filtration vessel 110 between the bottom screen 130 and the circulating fluid outlet 316 should be maximized so that the exact depth of the filter medium is not critical to the operation of the apparatus. For example, if the filtration apparatus is designed to operate at a filter medium depth of at least fifty-eight (58) inches so that a desired degree of fluid purification may be obtained, if the circulating fluid outlet 316 is sufficiently high above the designed filter medium depth, a filter medium depth of sixty-six (66) inches would not interfere with the operation of the scrubbing apparatus. There would be a sufficient volume within the filtration vessel between the bottom screen 130 and the circulating fluid outlet 316 to fluidize the filter medium before it is drawn through the circulating fluid outlet 316 and into the circulating pump 314.

One of the important advantages of using the contaminated fluid also as the scrubbing fluid is that the discharge from the contaminated fluid pump 214 is not closed during the scrubbing cycle. If the discharge from a pump is closed, the pump may exceed the pump manufacturer's specifications and could cause high wear or damage to the pump. As an alternative to using the contaminated pump 214 to introduce a scrubbing fluid into the filtration vessel 110, a separate scrubbing fluid pump (not shown) may be included in the apparatus for pumping a separate scrubbing fluid through the clean scrubbing fluid inlet 240 and into the filtration vessel 110. But if a separate scrubbing fluid pump is used, the contaminated fluid pump should be turned off during the steps of the short scrubbing cycle. For most applications, using a separate scrubbing fluid pump would needlessly complicate the filtration system.

During the first few seconds of the first step of the scrubbing cycle, the filter medium is unsettled, rotated, agitated, and then fluidized. Then the circulating pump 314 begins drawing fluidized filter medium from within the top portion of the filtration vessel 110 beneath the top screen 140, through the upwardly extending orifice 222 of the "T" 220, into the circulating pump 314, and the circulating pump 314 pumps the fluidized filter medium through the circulating fluid inlet 310, and injects the fluidized filter medium into the bottom portion of the filtration vessel above the bottom screen. If the circulating pump 314 is sufficiently powerful, the first step of the scrubbing cycle requires on the order of about one (1) second to about five (5) seconds.

The circulating pump 314 is designed with a set of special internal clearances so that it will not significantly grind up or damage the fluidized filter medium. Therefore, the filter medium remains in the filtration vessel for numerous cycles of operation. If the filter medium is comprised of crushed black walnut shells, the attrition of the filter medium should be very low. Within the first three months of operation, perhaps as little as five (5) percent of the filter medium may be ground up to particles small enough the pass through the bottom screen 130 or the top screen 140. Therefore, it is usually necessary to replace about five (5) percent to about seven (7) percent of the crushed black walnut shells every year. Low filter medium attrition translates to low maintenance. Other filter media tend to have greater attrition rates.

The fluidized filter medium has a low abrasiveness that will not damage the circulating pump 314. As the fluidized filter medium comes off the tips of the impellers of the circulating pump 314, the extreme velocity and agitation of the particulates of the fluidized filter medium causes the contaminates adhering to the particulates of the fluidized filter medium to sheer off and become suspended in the liquid part of the fluidized filter medium. If two or more particulates of the fluidized filter medium are stuck together by oil or grease, when they go through the circulating pump 314 they will be sheered apart and scrubbed clean.

The violent circulation through the circulating pump 314 causes the particulate and oil contaminates to become suspended in the scrubbing fluid. For example, if the contaminated fluid entering the filtration system during the filtration cycle contains one-hundred (100) milligrams-per-liter of contaminates, over a period of twenty-four (24) hours at a flow rate of sixteen (16) gallons-per-minute-per-square-foot of horizontal cross-sectional surface area of the filter medium, the filter medium could accumulate virtually all of the contaminates out of the contaminated fluid. When the filter medium is fluidized during the scrubbing cycle, the contamination level inside the filtration vessel could become extremely high, perhaps as high as twenty-thousand (20,000) milligrams-per-liter. The highly contaminated scrubbing fluid is removed from the filtration vessel 110 through the bottom screen 130 and the top screen 140 and through the bottom scrubbing fluid outlet 250 and the top scrubbing fluid outlet 260. The ratio of scrubbing fluid removed from the filtration vessel 110 through the bottom scrubbing fluid outlet 250 and the top scrubbing fluid outlet 260 may be controlled by the bottom scrubbing fluid orifice plates 254 and the top scrubbing fluid orifice plates 264. As the violent circulation of the fluidized filter medium continues, the contamination level of the fluid within the vessel is diluted by the inflow of relatively clean scrubbing fluid and outflow of relatively highly contaminated scrubbing fluid. The highly contaminated scrubbing fluid flows out of the filtration vessel 110 into a storage facility (not shown).

During the scrubbing cycle, the level of contamination within the filtration vessel becomes tremendous compared to the level of contamination in the contaminated fluid. Therefore, in a preferred embodiment of the invention, the contaminated fluid may be used as the scrubbing fluid instead of an initially pure scrubbing fluid. The "T" 244 obviates the need for a separate scrubbing fluid pump and a separate pure scrubbing fluid source.

During the first step of the scrubbing cycle, highly contaminated fluid passes through the bottom screen 130 and the top screen 140 and out through the bottom scrubbing fluid outlet 250 and the top scrubbing fluid outlet 260, respectively. The bottom screen 130 and top screen 140 may become plugged by heavy oils adhering to the surfaces of the screens and contaminate particles adhering to the heavy oils. The circulating pump 314 violently circulates the fluidized filter medium between the bottom screen 130 and the top screen 140 within the filtration vessel 110. The violent circulation of the fluidized filter medium scrubs the surfaces of the bottom screen 130 and the top screen 140. Every part of the filtration vessel between the bottom screen 130 and the top screen 140 should be exposed the circulating fluidized filter medium.

The bottom screen 130 and the top screen 140 allow scrubbing fluid to be withdrawn from the filtration vessel 110 over twice the surface area relative to an apparatus equipped with a single screen, such as the round cylindrical screens commonly used in the prior art or the flat screen used in the invention. Therefore, the differential pressure across the screen is only one-half the differential pressure across a single screen. The substantially reduced differential pressure greatly reduces the chance that the screens would ever become plugged. The principle of increasing the screen surface area can be extended by increasing the area of the top screen 140 relative to the area of the bottom screen 130. A limitation to this principle is that the design of the vessel must not allow any dead spaces during any of the operational steps of the apparatus.

Determining the amount of time required to complete the first step of the scrubbing cycle is simple. Assume that one the filter medium is fluidized, the level of contamination within the filtration vessel 110 becomes twenty-thousand (20,000) milligrams-per-liter. During the first step of the scrubbing cycle, scrubbing fluid is being simultaneously added to the filtration vessel and withdrawn from the filtration vessel. Therefore, for each volume of scrubbing fluid equal to the volume within the filtration vessel that flows through the filtration vessel, the level of contamination within the filtration vessel should be reduced by approximately fifty (50) percent. This reduction in contamination level assumes that the scrubbing fluid introduced into the filtration vessel is pure, which may or may not be true. But it is a simple calculation to account for the moderate contamination level of the scrubbing fluid, one-hundred (100) milligrams-per-liter, for example.

Continuing the example, if the filtration vessel 110 has a volume of one-thousand (1,000) gallons, then when one-thousand (1,000) gallons of scrubbing fluid has been pumped through the fluidized filter medium within the filtration vessel, the level of contamination within the filtration vessel would be reduced to about ten-thousand (10,000) milligrams-per-liter. When a second volume of one-thousand (1,000) gallons of scrubbing fluid has been pumped through the fluidized filter medium within the filtration vessel, the level of contamination would be reduced another fifty (50) percent, that is, from ten-thousand (10,000) milligrams-per-liter to about five-thousand (5,000) milligrams-per-liter. When the level of contaminates is reduced to about five-thousand (5,000) milligrams-per-liter, the filter medium is clean enough. The filter medium should not be cleaned too much because the remaining contaminates actually improve the filtration efficiency of the particulate filter medium by reducing the pore throat size of the particulate filter medium. Depending on the volume of the filtration vessel, the cross-sectional horizontal area of the filter medium, and the flow rate through the filtration vessel, the second step of the scrubbing cycle should be accomplished within as little as five (5) minutes, perhaps as long as thirty (30) minutes. Preferably the first step of the scrubbing cycle should require about ten (10) minutes.

Figure 3:
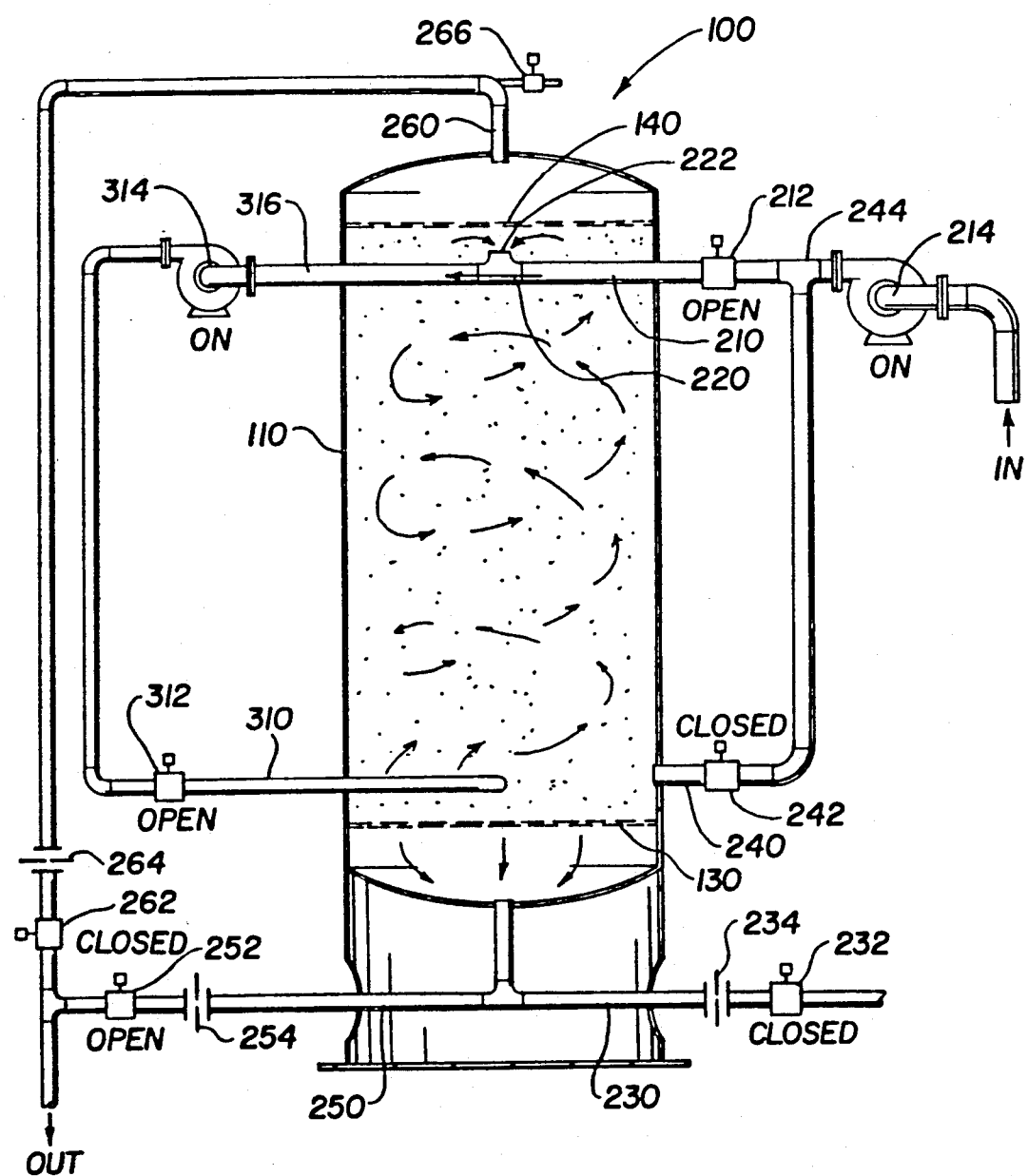
FIG. 3 is a diagram of a down flow filter system incorporating the multiple screen scrubbing apparatus of the invention, the apparatus is represented in the second step of a scrubbing cycle.

Referring now to FIGS. 3 and 6, during the second step of the scrubbing cycle, the contaminated fluid valve 212 is open. The bottom scrubbing fluid valve 252 is open and the top scrubbing fluid valve 262 is open. The purified fluid valve 232 may be open, but the scrubbing fluid within the filtration vessel is probably still much too highly concentrated with contaminates to remove through the purified fluid outlet 230. Therefore, the purified fluid valve 232 preferably is closed. The clean scrubbing fluid valve 242 is closed and the circulating fluid valve 312 is open. The top scrubbing fluid vent 266 also is closed.

The contaminated fluid pump 214 operates to pump contaminated fluid through contaminated fluid inlet 210, through the orifice 222 of the "T" 220, into the filtration vessel 110, through the bottom screen 130 and the top screen 140, and through the bottom scrubbing fluid outlet 250 and the top scrubbing fluid outlet 260. Therefore, the flow through the filtration vessel during the second step of the scrubbing cycle is the same as the flow through the filtration vessel during the filtration cycle.

The circulating pump 314, draws a portion of the contaminated fluid flowing into the "T" 220 through the circulating fluid inlet 316, and into the circulating pump 314. The circulating pump 314 pumps the contaminated fluid and any fluidized filter medium remaining in the circulating pump 314 through the circulating fluid inlet 310 and injects the contaminated fluid and fluidized filter medium into the bottom portion of the filtration vessel 110 above the bottom screen. The contaminated fluid pump 214 should pump at least as much contaminated fluid through the contaminated fluid inlet 210 and to the "T" 220 as the circulating pump 314 is capable of drawing through the "T" 220. The excess contaminated fluid that the circulating pump 314 does not draw into the circulating fluid outlet 316 flows out the upwardly extending orifice 222 of the "T" 220. The contaminated fluid pump 214 maintains positive pressure at the orifice 222 of the "T" 220 to prevent any fluidized filter medium from entering the orifice 222 of the "T" 220 and flowing through the circulating fluid inlet outlet 316 to the circulating pump 314.

One of the reasons for orienting the orifice 222 of the "T" 220 in an upward direction is to minimize the chance that fluidized filter medium enters the orifice 222 of the "T" 220 during the third step of the scrubbing cycle. For the same purpose of minimizing the chance that fluidized filter medium enters the orifice 222 of the "T" 220, the top scrubbing fluid valve 262 is preferably closed and the bottom scrubbing fluid valve 252 is preferably open so that there is less fluid flow in the upward direction toward the orifice 222 of the "T" 220.

Within one or two seconds of operation, the circulating pump 314 is cleared of fluidized filter medium. Displacing the fluidized filter medium from the circulating system is necessary if the circulating pump 314 is turned off without displacing the fluidized filter medium from the circulating system, in this event the settled filter medium between the circulating pump 314 and the circulating fluid inlet 310 is combined with the settled filter medium within the filtration vessel 110 and could exert a sufficient back-pressure on the high pressure side of the circulating pump 314 to prevent the circulating pump 314 from restarting.

Figure 4:
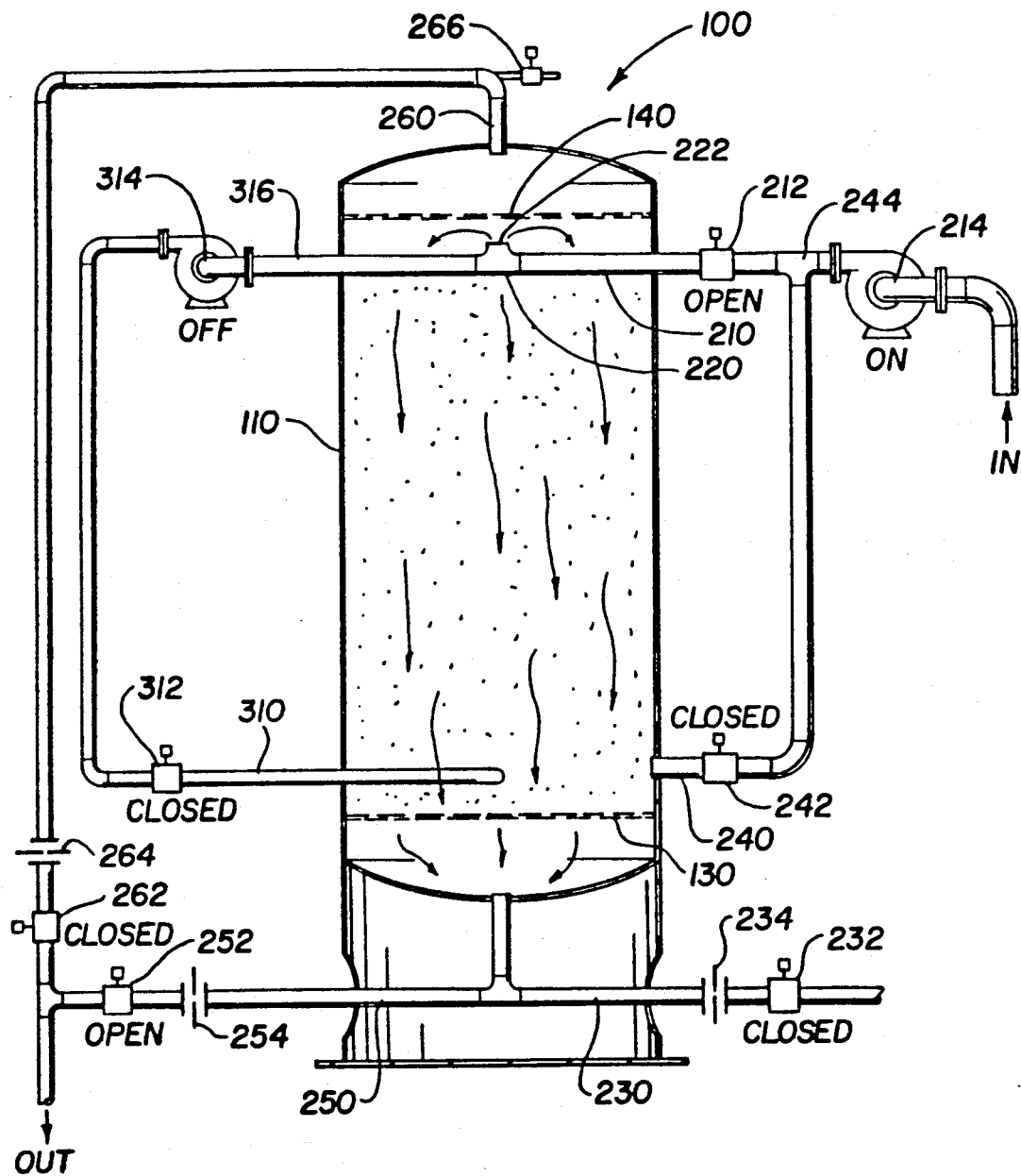
FIG. 4 is a diagram of a down flow filter system incorporating the multiple screen scrubbing apparatus of the invention, the apparatus is represented in the third step of a scrubbing cycle.

Referring now to FIGS. 4 and 6, during the third step of the scrubbing cycle, the contaminated fluid valve 212 is open. The scrubbing fluid within the filtration vessel is probably still much too highly concentrated with contaminates to remove through the purified fluid outlet 230. Therefore, in the preferred embodiment of the invention, the purified fluid valve 232 is closed while the bottom scrubbing fluid valve 252 is open. The top scrubbing fluid valve 262 is closed. The clean scrubbing fluid valve 242 is closed and the circulating fluid valve 312 is closed. The top scrubbing fluid vent 266 also is closed. The circulating pump 314 is off.

The contaminated fluid pump 214 operates to pump contaminated fluid through contaminated fluid inlet 210, through the orifice 222 of the "T" 220, into the filtration vessel 110, through the bottom screen 130, and through the bottom scrubbing fluid outlet 250. Therefore, the flow through the filtration vessel during the third step of the scrubbing cycle is the same as the flow through the filtration vessel during the filtration cycle. Any upward flow of any fluid through the filtration vessel 110, through the top screen 140, and out the top scrubbing fluid outlet 260 is stopped by the closed top scrubbing fluid valve 264. Any upward flow of any fluid through the filtration vessel and into the orifice 222 of the "T" 220 is prevented by the positive pressure of flowing contaminated fluid pumped into the filtration vessel 110 by contaminated fluid pump 214.

At the instant the third step of the scrubbing cycle begins, the direction of flow is changed from violent toroidal circulation to a strong down flow within the filtration vessel 110. The down flow should be at least as great as the flow rate through the filtration vessel 110 during a filtration cycle. Within a few seconds, the fluidized filter medium is force settled against the bottom screen 130 and the randomly and uniformly packed filter medium 120 is reconstituted.

Force settling of the fluidized filter medium is necessary to solve several problems when they occur with gravitational settling of a particulate filter medium. If the filter medium were settled by gravitation, the larger, heavier particles tend to settle toward the bottom and the finer, lighter particles tend to settle toward the top. The filtration characteristics of the filter medium would not be uniform throughout the depth of the filter medium. The top of a gravity settled filter medium will quickly blind off as it reaches dirt capacity. The chromatographic characteristics of the filter medium would also be impaired because the oils could chromatograph through different parts the gravity settled filter medium at different rates. The effective depth of a gravity settled filter medium would be a small fraction of the total depth of the gravity settled filter medium.

Figure 5:
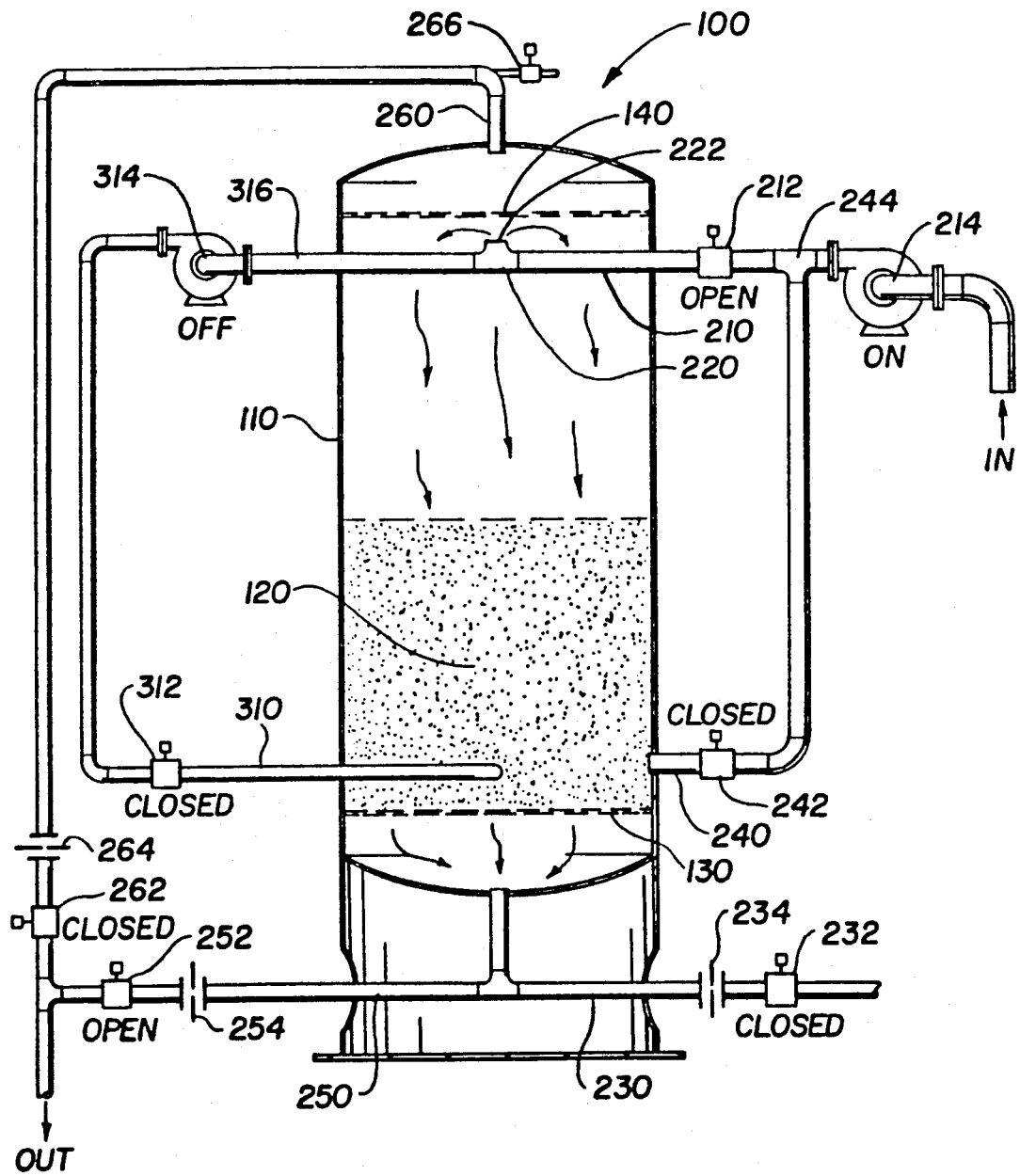
FIG. 5 is a diagram of a down flow filter system incorporating the multiple screen scrubbing apparatus of the invention, the apparatus is represented in the fourth step of a scrubbing cycle.

Referring now to FIGS. 5 and 6, during the fourth step of the scrubbing cycle, the contaminated fluid valve 212 is open. The scrubbing fluid within the filtration vessel is probably still much too highly concentrated with contaminates to remove through the purified fluid outlet 230. Therefore, in the preferred embodiment of the invention, the purified fluid valve 232 is closed while the bottom scrubbing fluid valve 252 is open. In order to purge the filtration vessel of scrubbing fluid highly concentrated with suspended contaminates, the bottom scrubbing fluid valve 252 should be kept open and the purified fluid valve 232 should be kept closed for a short time after the fluidized filter medium has been force settled in the third step, for example, ten (10) seconds to twenty (20) seconds, before beginning a subsequent filtration cycle. The top scrubbing fluid valve 262 is closed. The clean scrubbing fluid valve 242 is closed and the circulating fluid valve 312 is closed. The top scrubbing fluid vent 266 also is closed. The circulating pump 314 is off.

The contaminated fluid pump 214 operates to pump contaminated fluid through contaminated fluid inlet 210, through the orifice 222 of the "T" 220, into the filtration vessel 110, through the bottom screen 130, and through the bottom scrubbing fluid outlet 250. Therefore, the flow through the filtration vessel during the fourth step of the scrubbing cycle is the same as the flow through the filtration vessel during the filtration cycle. Any upward flow of any fluid through the filtration vessel 110, through the top screen 140, and out the top scrubbing fluid outlet 260 is stopped by the closed top scrubbing fluid valve 264. Any upward flow of any fluid through the filtration vessel and into the orifice 222 of the "T" 220 is prevented by the positive pressure of flowing contaminated fluid pumped into the filtration vessel 110 by contaminated fluid pump 214. Within a minute or less, depending on the flow rate through the filtration vessel 110, the filtration vessel 110 should be purged of the scrubbing fluid containing high levels of suspended contaminates.

Referring now to FIG. 6, the first time the apparatus is operated or if the power supply is interrupted, the apparatus should restart with the cold start step before a normal scrubbing cycle is initiated. If the power supply was interrupted during the first step or second step of a scrubbing cycle, the back-pressure exerted by the settled filter medium may prevent the circulating pump 314 from restarting. Therefore, the cold start step initially fluidizes the filter medium prior to starting the circulating pump 314, thereby relieving any back-pressure on the high pressure side of the circulating pump 314. The cold start procedure closely resembles the first step of the scrubbing cycle illustrated in FIG. 2, except that the circulating pump 314 is turned off instead of on. The scrubbing fluid flowing into the filtration vessel 110 through the clean scrubbing fluid inlet 240 should be sufficient to fluidize the filter media within a few minutes without the aid of the circulating system. The flow of clean scrubbing fluid into the filtration vessel 110 should be sufficient to actually remove most of any filter media remaining in the line between the high pressure side of the circulating pump 314 and the circulating fluid inlet 310. Once the filter medium is fluidized, the normal scrubbing cycle should begin. The subsequent steps of the normal scrubbing cycle ensure that the filter media 120 is reconstituted randomly and uniformly before beginning a filtration cycle.

The simplicity of the filtration apparatus incorporating the multiple screen scrubbing apparatus translates into low maintenance cost. The apparatus is easy to operate because it has so few pumps and valves. The apparatus is low maintenance because it has so few parts subject to wear and tear.

Reasonable variations can be made in view of the foregoing disclosure without departing form the spirit or scope of the invention.

We claim:

1. A method of scrubbing a particulate filter medium, wherein during a filtration cycle a particulate filter medium is retained within a filtration vessel by a bottom screen, but wherein during a scrubbing cycle the particulate filter medium is retained within a filtration vessel by at least one bottom screen and at least one top screen, the bottom screen and top screen used during the scrubbing cycle having a combined surface area substantially greater than the surface area of the bottom screen used during the filtration cycle so that the pressure differential across the bottom screen and the top screen during the scrubbing cycle is substantially reduced relative to the pressure differential across the bottom screen during the filtration cycle, the scrubbing method comprising:

fluidizing the particulate filter medium with a scrubbing fluid and violently circulating the fluidized filter medium through a circulating pump to remove accumulated contaminating material from the filter medium, thereby suspending the contaminating material in the fluidized mixture, and meanwhile diluting the level of suspended contaminating material in the fluidized mixture by circulating a scrubbing fluid through the fluidized filter medium so that the contaminating material is removed with the scrubbing fluid through the bottom screen and the top screen but the filter medium is retained within the filtration vessel by the bottom screen and the top screen.

2. The method of claim 1 wherein the pressure differential across the bottom screen and the top screen during the scrubbing cycle is reduced by about one-half relative to the pressure differential across the bottom screen during the filtration cycle.

3. The method of claim 1 wherein the filer medium is violently fluidized in a toroidal flow path within the filtration vessel so that the circulating fluidized filter medium scrubs the bottom screen and the top screen and thereby prevents the bottoms screen and the top screen from becoming plugged with contaminating material.

4. The method of claim 1 additionally comprising the steps of:
displacing the fluidized filter medium from the circulating pump with a scrubbing fluid;
force settling the fluidized filter medium to form a randomly and uniformly settled filter medium; and
purging the filtration vessel of scrubbing fluid having a high level of suspended contaminating material.

5. The method of claim 4 wherein the step of displacing the fluidized filter medium from the circulating pump and the step of force settling the fluidized medium occur simultaneously.

6. The method of claim 4 wherein a contaminated fluid is also used as the scrubbing fluid.

7. The method of claim 6 wherein the step of displacing the fluidized filter medium from the circulating pump with a scrubbing fluid is accomplished by placing a circulating fluid inlet of the circulating pump in fluid communication with a contaminated fluid inlet so that during the step of displacing the fluidized filter medium from the circulating pump, the circulating pump can draw contaminated fluid from the contaminated fluid inlet instead of fluidized filter medium from within the filtration vessel.

8. The method of claim 4 wherein the step of force settling the fluidized filter medium is accomplished by suddenly changing the direction of the violently circulating fluidized filter medium within the filtration vessel to a downward flowing fluidized filter medium whereby the scrubbing fluid passes through the bottom screen and the fluidized filter medium becomes a randomly and uniformly settled filter medium retained within the filtration vessel by the bottom screen.

* * * * *